United States Patent [19]

Coker

[11] Patent Number: 5,640,550
[45] Date of Patent: Jun. 17, 1997

[54] COMPUTER SYSTEM FOR GENERATING SQL STATEMENTS FROM COBOL CODE

[76] Inventor: Drake Coker, 691 S. Nardo, Apt. E8, Solana Beach, Calif. 92075

[21] Appl. No.: 228,567

[22] Filed: Apr. 15, 1994

[51] Int. Cl.$^6$ ........................................... G06F 17/30
[52] U.S. Cl. .................. 395/604; 395/612; 395/705; 364/280.4; 364/283.4; 364/DIG. 1
[58] Field of Search ........................ 395/500, 600, 395/700

[56] References Cited

U.S. PATENT DOCUMENTS

| | | | |
|---|---|---|---|
| 4,918,588 | 4/1990 | Barrett et al. | 395/600 |
| 4,918,593 | 4/1990 | Huber | 395/DIG. 1 |
| 4,930,071 | 5/1990 | Tou et al. | 395/600 |
| 4,931,928 | 6/1990 | Greenfield | 395/600 |
| 5,091,852 | 2/1992 | Tsuchida Te Al. | 395/600 |
| 5,230,049 | 7/1993 | Cheng et al. | 395/700 |
| 5,295,222 | 3/1994 | Wadhwa et al. | 395/1 |
| 5,307,484 | 4/1994 | Baker et al. | 395/600 |
| 5,432,930 | 7/1995 | Song | 395/600 |

OTHER PUBLICATIONS

"The Transition of Application Programs From COBOL to a Fourth Generation Language", Rugaber et al., Software Maintenance, 1993 Conference, IEEE Jan. 1993.

*Primary Examiner*—Thomas G. Black
*Assistant Examiner*—Hosain T. Alam
*Attorney, Agent, or Firm*—C. Emmett Pugh; Pugh/Associates

[57] ABSTRACT

An interfacing computer program and system which allows a COBOL program, despite its totally different nature and internal data handling constructs and statement approaches, to effectively generate Structured Query Language (SQL) statements in accessing and using data from a SQL oriented database (8–9) and getting appropriate data back in a form consistent with what the COBOL program expects. The program's interface module (5) receives COBOL statements from an appropriately compiled COBOL program (3), and, using information contained in a data dictionary (4) created when the COBOL program (1) was compiled (note compiler 2), generates the appropriate SQL statements to access and generate the appropriate data from a SQL oriented database (8–9) for sending back to the COBOL program (3). A number of innovative programming and logic techniques are used, with innovative techniques for enhanced speed of execution.

9 Claims, 1 Drawing Sheet

COMPUTER SYSTEM FOR GENERATING SQL STATEMENTS FROM COBOL CODE

BACKGROUND OF THE INVENTION

1. Field of Invention

The present invention relates to computer programs, and more particularly to a computer system, including programming principles and practices, used in converting statements from one computer language into a different, generally inconsistent language. The invention in its preferred embodiment further relates to, inter alia, an interfacing program which allows a COBOL program, despite its totally different nature and internal data handling constructs and statement approaches, to generate Structured Query Language (SQL) statements in creating, accessing and/or using data from a SQL oriented database and getting appropriate data back in a form consistent with what the COBOL program expects.

2. General Background

As noted in the *SQL Programmer's Guide* (Gupta & Gietz, Que, 1989, ISBN 0-88022:390-1), a database is like an electronic "filing cabinet". It is used for the same purpose as any other filing cabinet—to store records. A basic difference, of course, is that, with a database, the records are stored electronically.

To get at stored records, or even to store them in the first place, a system is needed for managing the database. A database management system (DBMS) enables operations to be performed, e.g.—"Bring me this file," "Update this record," etc.—on the contents of the cabinet.

Various types of DBMS's exist, representing different approaches to the tasks of furnishing access to information in a database, preserving the data's integrity, keeping track of the users, providing security, and so on. Generally speaking, all of the DBMS's can be classified into two kinds—relational and non-relational. By and large, all of the newer systems on the market are "relational".

One of the relational type database languages that has been gaining great prominence is the Structured Query Language (SQL), formerly called "Sequel". SQL's background and history, and the details and workings of the language, are described in, for example, the *SQL Programmer's Guide* referred to above. Although the language has not been totally standardized and there are a number of vendors (e.g., Informix™, Oracle™, etc.) who sell variants of the language, SQL generally will include at least the following statements (or their equivalents or variants) which are used in the exemplary embodiment of the present invention:

| | | |
|---|---|---|
| ALTER | ALTER TABLE | CLOSE |
| COMMIT | CREATE INDEX | CREATE TABLE |
| DECLARE CURSOR | DELETE | DROP |
| EXEC SQL | EXECUTE | FETCH |
| FETCH INTO | GRANT | GROUP BY |
| INSERT | MODIFY | OPEN |
| ORDER BY | PREPARE | RENAME TABLE |
| ROLLBACK | SELECT | UPDATE |
| WHENEVER | | |

With respect to the nature or structure of an SQL oriented database, it includes a collection of tables (each two dimensional having columns and rows), in which the data has been at least in part pre-processed. It includes a series of restrictions and qualifications not found in other languages, particularly COBOL (Common Business Oriented Language), which as explained more fully below, has its own philosophical approaches, restrictions and qualifications.

Many companies today have developed very valuable SQL oriented databases having values in the many millions of dollars, and it is highly desirable for a company's program(s) to be able to access and manipulate the data in such databases through the SQL language. However, a number of well established business programs which are very widely in use today (perhaps even dominant in the business world), being based on programming languages which were created many years ago, were written in languages having a totally different approach and programming philosophy highly inconsistent with the approach and philosophy of SQL, making the two very large and very valuable "worlds" heretofore practically inconsistent and incompatible.

A prime example of this situation is the business dominant programming language of COBOL, which traces its development back to 1960 (and earlier). It has had at least two standardized versions since then, namely ANSI-74 and ANSI-85.

For additional background information on the COBOL language and in particular the AcuCOBOL™-85 version of the COBOL (ANSI-85) language, in which the exemplary embodiment of the invention described in detail below was developed, reference is had to, for example, the *AcuCOBOL™-85 COBOL COMPILER (Version 2.0) User's Guide & Reference Manual* (AcuCOBOL, Inc., San Diego, Calif., 1991), the disclosures of which are incorporated herein by reference.

COBOL's database scheme is purely sequential and non-relational due to its historical development many years ago during the time period when the only practically available form of "memory" was IBM™ type punch cards, paper tape and later magnetic tape. Such a scheme is purely one dimensional and is very limited in comparison to the approaches of DBMS's available today, such as, for example, the Structured Query Language or "SQL" database, discussed above.

In contrast, a SQL database is a relational database which is random in nature in the way it presents its data in its two dimensional tables in its database structure. The randomness nature of an SQL database is part of its strength. However, when one remembers the dominant existence of COBOL programs through out the world, it and the totally different way the two languages handle and consider data and the significant differences in allowed language statements, has created a heretofore insurmountable obstacle insofar as allowing a COBOL program to use an SQL oriented database.

However, those obstacles have all been overcome in the present invention, with the invention achieving for the first time that which was heretofore thought to be at least practically if not technically impossible.

GENERAL SUMMARY DISCUSSION OF THE INVENTION

The present invention thus provides the interfacing means or programming features and techniques which allow a COBOL program to directly access and effectively use data from a SQL database.

The present invention is directed to a computer system, including a program or program subset, having one or more of the various programming principles, guidelines and innovations of the present invention, to generate and execute "Structured Query Language" (SQL) statements based on COBOL code, so that a COBOL program can now access and use data in an SQL oriented database as if the data were in COBOL form. Thus, with the present invention venerable COBOL programs, with the advantages that language provides, can also directly access the ever expanding world of SQL databases, thereby obtaining also the advantages of the advances in that language.

Part of the tremendous economic value of the invention lies in part in its ability to allow the selling of database management systems to COBOL shops (provided these shops convert to a supported COBOL language, e.g., AcuCOBOL™, and use the present exemplary embodiment of the invention), as well as COBOL to DBMS shops, etc. The preferred embodiment that is described in some detail below is based on the exemplary use of a COBOL program following AcuCOBOL™-85 (COBOL ANSI-85) working with an Informix™ SQL database. With respect to these two vendors' products, both publish substantial information about their programs and their respective versions of COBOL and SQL, the disclosures of which publications are incorporated herein by reference.

Since COBOL and SQL evolved differently, they have different data types. Part of the invention resides in the treatment of COBOL type data so that it can function in a SQL type table with the expense (time) of conversion between the two being acceptable. The conversion table preferably is done once at compile time when all of the data definitions are known from the COBOL source code.

At runtime, SQL statements are generated and executed based on the statements and data needs of the user's COBOL, which typically will be in compiled, object code form.

As discussed in some detail below, there are a number of major translation, conversion and format problems that the present invention has solved using innovative techniques and solutions.

The scope of the exemplary embodiment of the invention is the entire COBOL instruction set based on COBOL ANSI standard 85 and preferably at least the SQL statements listed above. In the invention there is effectively a conversion of COBOL logic, structure and statements to SQL established or acceptable statements, allowing access to the data in spite of the tremendous differences between the logic, philosophy and data structure and handling approaches of the two languages. However, if so desired, the present invention can be limited to be used or be compatible with only a subset of COBOL, typically including at least a number of the statements relevant to I/O (input/output), namely CLOSE, DELETE, OPEN, READ, REWRITE, START, UNLOCK & WRITE. Additionally, as the COBOL and SQL languages expand and change, the exemplary embodiment can be readily modified to accommodate these future developments.

In operation, in the exemplary embodiment, a COBOL program in source code form is compiled using a COBOL compiler, which operates in accordance with the principles of the present invention. As the source code program is being compiled, the COBOL program is analyzed and evaluated, particularly with respect to its data fields and how those fields are used, with the compiler producing not only the compiled COBOL program in object code form (as is standard), but also a data dictionary file in which a series of values is set based on the compiler's analysis and evaluation of the COBOL program. Then, as the compiled COBOL program executes and needs data from the SQL database, its COBOL I/O statements are received by an interface program, which then generates and sends SQL statements to the SQL database based on the COBOL statements, obtaining the data desired by the COBOL program from the SQL database.

This operation of the invention's programs in its preferred approach is "seamless" and requires no SQL awareness on the part of the COBOL program. Insofar as the COBOL program is aware, it is running COBOL I/O statements and receiving COBOL data back in return, although in fact the data came from or was produced by standard queries operating though a SQL oriented and run database by means of the invention's interface program.

It is noted that in the preferred embodiment the data dictionary is created during the compiling process and saved for interaction with the compiled program during runtime. Although this procedure, as described fully below, is believed to be the most efficient, the invention can be employed in a system where its parts or all of them are utilized or created at compile time or runtime, if so desired.

It is therefore an object of the present invention to provide a practical means for allowing a COBOL program to create, access, manipulate and/or receive processed data to and from a SQL oriented database.

It is another object of the present invention to achieve this in a way which does not require the COBOL program to be in and of itself SQL aware or oriented.

It is a further object to achieve these heretofore "impossible" goals with the program operating speedily and effectively and without any significant burden on the COBOL program's users.

BRIEF DESCRIPTION of the DRAWING(S)

For a further understanding of the nature and objects of the present invention, reference should be had to the following detailed description, taken in conjunction with the accompanying drawing, wherein:

FIG. 1 is a block diagram illustrating in generalized form how the exemplary embodiment of the invention works and interfaces and communicates with the various elements of the exemplary embodiment.

DETAILED DESCRIPTION of PREFERRED, EXEMPLARY EMBODIMENT

Figure 1:
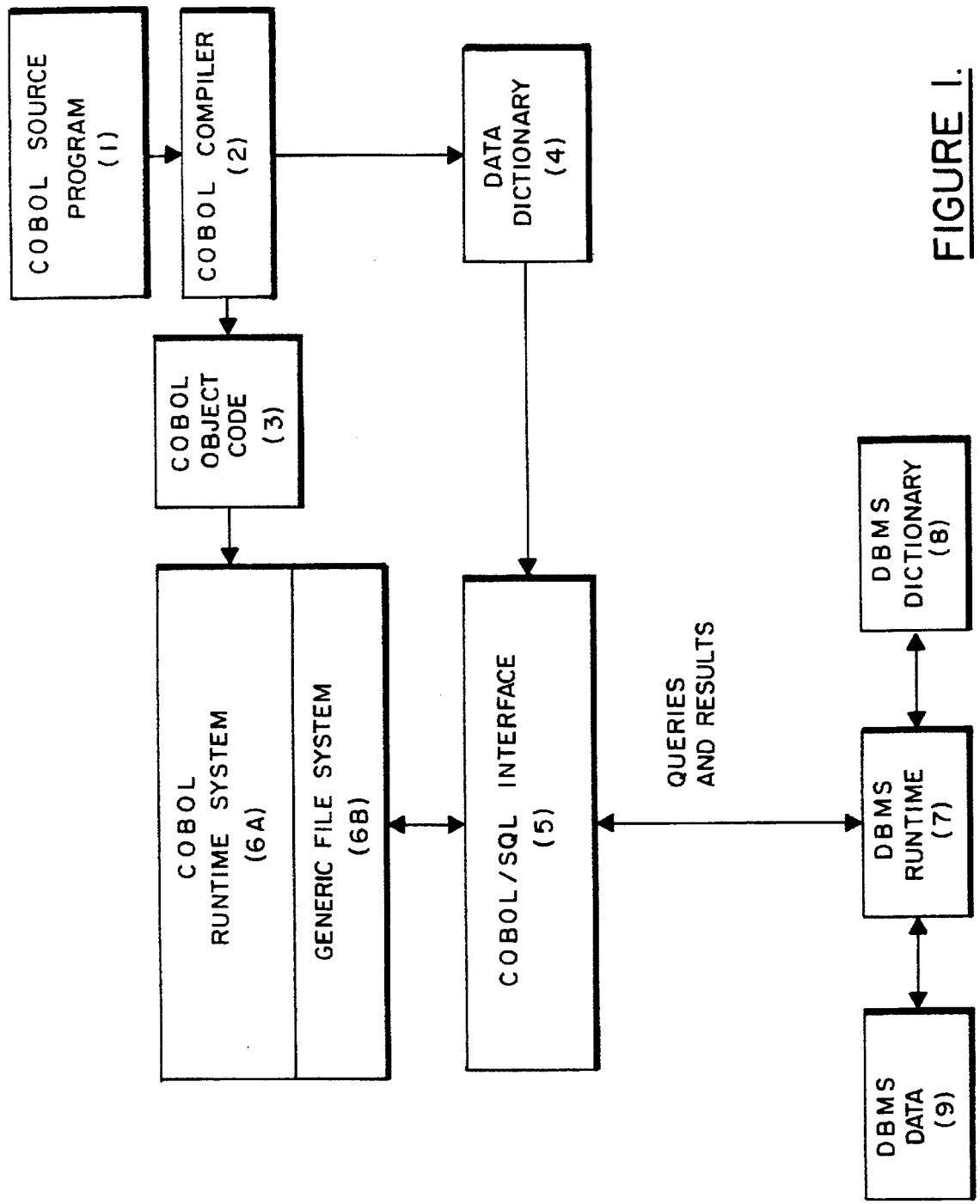

As can be seen in FIG. 1, a COBOL program in source code form 1 is typically compiled by a COBOL compiler 2 (e.g. AcuCOBOL™-85) to produce a compiled COBOL program 3 in object code form. This in and of itself is standard practice.

However, using the translation and conversion principles of the present invention and doing the evaluation work necessary in order to perform the translating interfacing of the compiled COBOL program 3 with the SQL oriented database (7-9), the compiler also produces a data dictionary file 4 which stores a set of values which will be used by the interface program 5.

The data dictionary 4, which maps the COBOL records of the compiled COBOL program 3 to the database's fields in the SQL database 8 based on an analysis and evaluation of the COBOL program 1/3 during the compiling operation, is a very important part of the exemplary embodiment and is discussed more fully below.

All of this takes place within a computer running the program in conjunction with the data dictionary 4 of the invention, working in connection with the user's compiled COBOL program 3 and the SQL oriented database (7-9).

The SQL database typically includes a runtime version of the SQL language database program 7 (e.g. Informix™ SQL) working with the data 9 in the database with the assistance of the DBMS dictionary 8. The SQL oriented database can be located in the memory storage sub-system of the user's computer or at a remote but accessible computer.

Although included together in FIG. 1 for the general purposes of illustration, it should be understood that the compiling of the COBOL source code program 1 by the compiler 2 to produce the compiled program 3 typically takes place at a different time and indeed often at a different location than that where the compiled COBOL program 3 and its accessing of the SQL oriented database 7–9 occurs. Thus, for example, a program developer may develop the source code program and then compile it, thereafter distributing the compiled object code version of the program to the developer's user base.

For an exemplary embodiment of the present invention and for purposes of illustration only, the preferred embodiment will be described in the context of using an AcuCOBOL™-85 compiled and compatible COBOL program 3 on one side and an InformixSQL™ program for the SQL language on the other side. However, it should be understood that the invention has far ranging applicability with regards to various other versions and dialects of the COBOL and SQL languages generally.

The programming problems and obstacles encountered in making the present invention will now be described and the solutions of the exemplary embodiment therefor further described in some detail.

Accessing Data with AcuCOBOLT™-85 Programs

The standard file system supplied with AcuCOBOL™-85 is the Vision indexed file system from AcuCOBOL™. Vision supports variable-length records, data compression, and data encryption.

At the user's option, Vision can be replaced by (or used in conjunction with) other indexed file systems such as C-ISAM™, and relational database management systems such as Informix™. This interchangeability of file systems is possible because all of AcuCOBOL's I/O passes through a generic file system 6B that can accommodate a wide variety of protocols.

Interface Routines

All file systems that are external to AcuCOBOL™-85 communicate with the AcuCOBOL generic file system 6B via interface routines. These routines are available from AcuCOBOL as add-on modules.

Data Dictionaries

Relational databases such as Informix™ interface to AcuCOBOL™-85 via a special family of add-on interfaces 5. Because relational databases manipulate fields, and COBOL programs manipulate records, some mapping is necessary to associate records with their fields. The interfaces 5 use data dictionaries 4 that help to map COBOL records into relational database fields, and map the database fields back into records.

The following discussions describes the exemplary computer system of the present invention and explains how they interface to file systems by referencing data dictionaries.

Interfaces to indexed file systems such as C-ISAM™, MINISAM, and Btrieve do not require data dictionaries. Those interfaces are documented in separate booklets.

Database Concepts

Databases such as Informix™ differ from indexed file systems in some significant ways. They operate on fields rather than on records. Each file is logically represented in table form. Within a table, each column represents one field, each row represents one record.

For example:

| Name | Acct. Number | Last Purchase | Amount |
| --- | --- | --- | --- |
| Smith, C. | 23278 | 02/19/91 | 123.50 |
| Jones, B. | 34657 | 03/14/91 | 652.00 |
| Foster, V. | 12976 | 09/30/90 | 1,260.75 |
| Malden, G. | 25556 | 06/13/91 | 985.45 |
| Drake, F. | 34857 | 07/15/89 | 799.00 |
| Hoover, L. | 29384 | 10/04/91 | 45.00 |
| Pierce, S. | 64532 | 01/15/91 | 75.00 |

The names of the columns are analogous to the names of fields in an indexed file.

Each of the following COBOL concepts is associated with the SQL database concept listed beside it:

| COBOL Concept | Database Concept |
| --- | --- |
| Directory | Database |
| File | Table |
| Record | Row |
| Field | Column |

For example, a COBOL record that looks like this:

```
01    AR-CODES-RECORD.
    03    AR-CODES-KEY.
        05    AR-CODE-TYPE        PIC X.
        05    AR-CODE-NUM         PIC 999.
01    TERMS-CODE-RECORD.
    03    TERMS-RATE              PIC S9V999.
    03    TERMS-DAYS              PIC 9(3).
    03    TERMS-DESCRIPT          PIC X(15).
``` would be represented logically in the database in a format similar to this:

| ar-code-type | ar-code-num | terms-rate | terms-days | terms-descript |
| --- | --- | --- | --- | --- |
| N | 234 | 1.500 | 10 | net 10 |
| N | 235 | 1.750 | 10 | net 10 |
| T | 245 | 2.000 | 30 | net 30 |
| U | 255 | 1.500 | 15 | net 15 |
| N | 236 | 2.125 | 10 | net 10 |
| N | 237 | 2.500 | 10 | net 10 |
| U | 256 | 2.000 | 15 | net 15 |

When COBOL applications access a database, each COBOL I/O operation performs an operation on an entire row in a table in the database.

How the Interface Works

The interfaces 5 of the exemplary embodiment make it possible for the user to access SQL relational databases such as Informix™ directly from the user's COBOL applications.

Previously, accessing SQL relational databases involved writing Standard Query Language (SQL) code and embedding that code in the user's COBOL program. The user had to know SQL and had to write SQL statements appropriate for the specific database the user wanted to access. Because the user's queries were tailored to suit one database management system, the user's code had to be changed if the user later wanted to access a different DBMS with the user's application, or access an indexed file system instead.

The exemplary embodiment of the invention preferably provides a seamless interface between the program and the SQL relational database. This means that the information exchange is so smooth that it appears to the end COBOL users that the database and the COBOL program are part of the same process. For example, if the COBOL program specifies a READ, this is automatically translated by the interface into a database SQL type query, which may be printed in addition to being executed. Then the data that is read from the database is automatically translated into a COBOL record. This exchange occurs in fractions of a second, and the application proceeds without interruption.

The exemplary embodiment interfaces are categorized as seamless because the communication between the COBOL program and the SQL database is smooth, with no data duplication, no special query coding on the part of the COBOL programmer, and no interruptions in the execution of the program. Additionally, the COBOL code need not be changed if the COBOL user later wants to access a different database or access an indexed file system.

Steps For the User to Follow

This seamless dialogue is possible because the exemplary embodiment interface 5 (see FIG. 1) builds its own database queries whenever a COBOL input or output request is received. These are the steps that preferably occur in the exemplary embodiment.

Compile with –Zx

1. The user writes a standard COBOL application and compiles it with a compiler, such as, for example, the AcuCOBOL-85™ compiler. When the users compiles, the user specifies via a compile-time option that the user wants the compiler to generate data dictionaries, in addition to an object code file.

Dictionaries are Created

2. A data dictionary of the exemplary embodiment is created by the compiler for each file in the program. These data dictionaries map COBOL records to the fields that they comprise.

Set DEFAULT-HOST Variable

3. In the configuration file, the user specify which DBMS the user are using. This is set with the DEFAULT-HOST variable. For example, the user might set "DEFAULT-HOST informix".

Set DATABASE Variable

4. In the configuration file, the user specifies which database the user is using. This is set with the DATABASE variable. For example, "DATABASE stores" selects the demonstration database named "stores" that is shipped with Informix™.

I/O Requests are Passed to the Interface

5. The user uses the embodiment's runtime system to execute the application. Whenever the runtime system encounters an input or output instruction (such as READ or WRITE), it passes the request to the interface 5.

SQL Statements are Built Automatically

6. The interface automatically builds SQL instructions that the database management system can understand. As it builds these SQL instructions, it looks at the AcuCOBOL data dictionary, which associates the COBOL records with their fields.

Database is Accessed

7. The database management system uses its own dictionary as a pointer into its own data files, performs the requested I/O operation, and passes the results back to the interface 5.

COBOL Records are Formed

8. The interface translates the data fields into COBOL records, which are then passed back to the runtime system 6A via the generic file interface 6B.

All of this communication is preferably automatic, and all database queries and translations are performed behind the scenes, so that the COBOL end user preferably experiences no interruption in program execution.

Data Dictionaries

Very important to the exemplary embodiment's database interface are the data dictionaries 4 that map COBOL records to database fields. These dictionaries are called extended file descriptors (XFD's) because they are based on the standard COBOL file descriptors (FD's).

XFD Files

Each COBOL file has a corresponding XFD file. XFD files are created by the compiler when the user specifies the "–Zx" compile–time option. When this option is used, an XFD file is created for every file contained in the compiled program.

Creating XFD files at compile time offers two significant advantages:

Any changes made to the files are automatically included in the data dictionaries when the program is re-compiled.

The effects of all compile-time options, COPY REPLACING, and source-code control lines are reflected correctly in the dictionaries.

The XFD file describes a COBOL file from the point of view of the fields the file contains. It also contains all of the standard information used by the non-database file systems. This information is not strictly required for the database interface 5, but it is generally useful. The XFD file is a simple text file. The format of this file is as follows:

The first line contains the phrase "XFD,01," followed by the SELECT name of the COBOL file and the basename of the XFD file. For example:

"XFD,01,CUSTOMER-FILE,CUSTFILE."

This line is used to identify the XFD file. The "01" identifies the format used for the XFD file (revision "01").

The second line contains the logical parameters field used by the generic file system. This consists of the maximum record size, the minimum record size and the number of keys, all separated by commas.

Then follows a number of sections equal to the number of keys in the file. Each section has the following format:

a. The key definition string used by the generic file system for the key being defined. This consists of a series of comma-separated numbers. These values are—the number of segments, the duplicate flag and the key size and offset for each segment. This is described in more detail in the "File System Interface" documentation of the *AcuCOBOL User's Guide & Manual* referred to above.

b. The number of field definitions that are contained in the key. Since the database does not understand the notion of a group item, each key must be described as a series of individual fields.

c. The name of each field contained in the key then follows, one per line.

For example, suppose you had the following COBOL FD:

```
01  KEYWORDS-RECORD.
    03  KEYWORDS-KEY
        05  KEYWORD-WORD        PIC X(15).
        05  KEYWORD-ID          PIC 9(7).
    03  KEYWORD-PERCENT         PIC 9(3)V99 COMP-3.
```

This would produce the following XFD:

| | |
|---|---|
| XFD,01,KEYWORDS-FILE,KEYWORDS | (file identification) |
| 00025,00025,001 | (max-rec,min-rec,# of keys) |
| 1,0,022,00000 | (layout of first key) |
| 02 | (# of fields in key) |
| KEYWORD-WORD | (field names in key) |
| KEYWORD-ID | |
| 000 | (# of conditions) |
| 0003 | (# of fields in record, followed by field definitions) |
| 00000,00015,16,00015,+00,000,000,KEYWORD-WORD | |
| 00015,00007,01,00007,+00,000,000, KEYWORD-ID | |
| 2,00003,08,00005,-02,000,000, KEYWORD-PERCENT | |

4. After the key definitions come a series of condition definitions. Condition definitions are used to identify fields that are not present in every record. This is described in more detail below. The first line after the key definitions contains a count of the number of condition definitions that follows (3 digits).

5. Each condition's definition then follows, one per line. The condition definitions have the following format (each field is separated from the next by commas):

a. The condition number (3 digits).

b. The condition type: "1"=equality condition, "2"= inequality condition or "3"="and" condition.

c. For condition types 1 and 2, what follows is the name of the field to test and the value to test for. For condition type 3, what follows is the numbers of the two condition and "and" together.

5. After the condition definitions are completed, the fields are defined. This line contains the number of fields that are defined (4 digits).

6. The count field is followed by each field definition, one per line. This definition consists of a series of comma-separated entries. These entries are as follows:

a. The offset of the field, in bytes (5 digits).

b. The size of the field, in bytes (5 digits).

c. The type of the field, using the "sub.h" values (2 digits).

d. For numeric fields, the number of digits in the field. For nonnumeric fields, this is the same as the size field (5 digits).

e. The scale of the field, expressed as a power of 10. For example, a numeric field with two digits after the decimal point has a scale of -2. For nonnumeric fields, this value is zero. The value is expressed as a "+" or a "-" followed by 2 digits.

f. The "user type" of the field. This will be described later. The default value is zero (3 digits).

g. The condition number to apply to this field, or zero if the field appears in every record (3 digits).

h. The name of the field.

It is noted that the group items have been eliminated from the XFD file. This is because group items are not fields— they are collection of fields.

Defaults Used in the Dictionaries

There are several elements of COBOL that require special handling when data dictionaries are built. These include multiple record definitions, REDEFINES, FILLERs, and OCCURSQL. This section describes how AcuCOBOL™-85 handles each of these situations.

Note that, in the exemplary embodiment, in some cases the user can override the default behavior by placing a special comment line in the user's COBOL code. These comments are called directives, and they are all described more fully below.

REDEFINES

Fields contained in a redefining item occupy the same positions as the fields being redefined. Databases generally do not support the notion of multiple definitions for the same column. For this reason, one needs only to select one of the field definitions to use. The default rule that is followed in the exemplary embodiment is to use the fields in the item being redefined, and ignore any fields that appear subordinate to a REDEFINESQL.

Multiple Record Definitions

In the exemplary embodiment this same rule extends to multiple record definitions. In COBOL, multiple record definitions are essentially redefinitions of the entire record area. This leads to the same complication that is present with REDEFINES: multiple definitions for the same data. So one needs to select one definition to use.

Because the multiple record types can be different sizes, the largest one preferably is used, so that all of the fields can be adequately covered. The rule for the exemplary embodiment is to use the fields in the largest record defined for the file. If more than one record is the largest, the first one of those is used.

Group Items

It should be noted that group items are never included in a data dictionary for the same reason that REDEFINES are excluded—they result in multiple names for the same data items. The user can, however, choose to combine grouped fields into one data item by specifying the "use group" directive, described later.

FILLER Data Items

FILLER data items require special handling because they do not have a name. SQL databases do not allow unnamed columns. So FILLER data items are not placed in the AcuCOBOL dictionary 4, but the compiler issues a warning whenever it rejects a FILLER field. The user can then choose to add a name to the FILLER item with the "name" directive, described below.

Identical Field Names

In COBOL identical field names are resolved by qualification. But database systems consider duplicate names an error. Thus, in the exemplary embodiment, if more than one field in a particular file has the same name, the data dictionary 4 will not be generated for that file.

The preferred solution to this situation is to add a special comment line that associates an alternate name with each of the conflicting fields. The "name" directive, described below, is placed on that comment line.

Long Field Names

Field names longer than eighteen (18) characters are truncated to eighteen (18) characters by the interface, to meet SQL requirements.

Naming the XFD

A name must be given to each XFD (data dictionary) 4 that is built. Each XFD name preferably is built from a starting name that is derived from the user's COBOL code. The following paragraphs explain how that occurs.

ASSIGN Name is a Variable

If the SELECT for the file has a variable ASSIGN name (such as ASSIGN TO FILENAME), then the user must specify a starting name for the XFD file via a comment in the user's code. This process is described below in the section titled "Using Directives".

ASSIGN Name is a Constant

If the SELECT for the file has a constant ASSIGN name (such as ASSIGN TO "COMPFILE"), then in the exemplary embodiment that name is used as the starting name for the XFD name.

ASSIGN Name is Generic

If the ASSIGN phrase refers to a generic device (such as "DISK"), then in the exemplary embodiment the SELECT name is used as the starting name.

Forming the Final XFD Name

From the starting name, this is how the final name is formed in the exemplary embodiment:

1. The starting name is stripped of any extensions.
2. A "universal" base name is constructed. We construct the base name by stripping out directory information that fits any of the formats used by the operating systems that run AcuCOBOL™-85.
3. This base name is then reduced to eight characters and converted to lower case.
4. The base name then has the letters ".xfd" appended to it.

| Examples of XFD Names | |
|---|---|
| COBOL Code: | File Name: |
| ASSIGN TO "usr/ar/customers.dat" | customer.xfd |
| SELECT TESTFILE, ASSIGN TO DISK | testfile.xfd |
| ASSIGN TO "-D SYS$LIB:HELP" | help.xfd |
| ASSIGN TO FILENAME | (the user specifies) |

Getting Started

The user will typically be in one of two situations in starting to use the preferred embodiment. In situation one, the database files do not exist yet, and will be brand new. In situation two, the database files already exist, and the user wants to access that existing data from a COBOL application (⅓ of FIG. 1).

Each situation brings up its own issues. For example, one must consider how the COBOL data is declared so that it matches the database data, and if there are any special fields in the database that must be accessed in a special way.

No matter which situation exists at the user's site, if the user is writing a new COBOL application that will access a specific SQL relational database, it's simplest if the user chooses COBOL record names, field names, and data types that accommodate the special rules and restrictions imposed by the database management system. For example, fields within a file preferably should have unique names, and should be no longer than eighteen (18) characters.

Adhering to the rules of the DBMS ensures that the user's COBOL application will produce accurate data dictionaries when it's compiled.

The following are automatically handled by the interface 5 of the preferred, exemplary embodiment:

- The preferred program of the invention automatically converts uppercase field names to lowercase (and vice versa) when necessary, so the user need not be concerned with case differences.
- Numeric data is assumed to be positive, so the user need not specify a sign. If negative data is possible in a field, the user must specify an "S" in the PICTURE clause.
- The preferred program of the invention automatically performs the conversions needed to match the internal storage formats used by the database.
- If the database files do not already exist, they will be created for the user automatically. If this is the user's situation, the user will have no concerns about matching COBOL fields to database fields. The fields will match perfectly, because the database fields will be based on the user's COBOL code.

Accessing Existing Database Files

If the user is accessing existing data in a relational database, the user needs to know how to declare the user's data so that it will match the database fields.

If the user's COBOL code isn't written yet, the user preferably should follow the guidelines given in this section.

If the user's COBOL application already exists, the user can make the necessary adjustments by adding directives to the user's code. Directives are comments that guide the creation of the data dictionaries. The dictionaries in turn help map the COBOL fields to their equivalent database fields.

These directives are described below in the section sub-titled "Using Directives".

Matching Existing Text Fields

To access character data, the user simply declares the field as PICTURE X, with as many X's as appropriate.

Matching Existing Numeric Fields

Numeric SQL database fields generally fall into one of these types—INTEGER, SMALLINT, DECIMAL, MONEY, SERIAL, FLOAT, DATE INTERVAL, or BLOB.

The following table shows how most of these numeric data types preferably are declared in the user's COBOL program:

| SQL Database Data | COBOL PICTURE |
|---|---|
| INTEGER | PIC S9(10) |
| SMALLINT | PIC S9(5) or PIC S9(4) COMP-4 |
| DECIMAL(6,2) | PIC 9(4)V99 |
| MONEY(4) | PIC 9(2)V99 |
| SERIAL | PIC 9 |
| FLOAT | PIC S9(nn) |

DATE INTERVAL and BLOB (Binary large object) are not included.

As many 9's should be used in the COBOL program's PICTURE phrase as the user needs to accommodate the largest data that could be stored. If the user knows the data well enough to know the largest possible value, or if the user know that the data is always positive, the COBOL program's PICTURE phrase should be adjusted to reflect the user's situation.

USAGE Types

The USAGE type the user declares in COBOL is not really essential to the invention, because the preferred embodiment of the invention will do its conversion work regardless. However, it is noted that the conversion of the data is somewhat more efficient if the user uses COMP-4. The table below presents what the preferred conversion will be from COBOL to SQL by the interface 5 based on how the COBOL data is declared, as detailed in the first column.

| DATA DECLARATION CONVERSION TABLE | | |
|---|---|---|
| COBOL | | SQL |
| PIC X(15) | ≡ | CHAR(,15) |
| PIC 9 99 999 9999 | ≡ | SMALLINT |
| PIC 9(5) 9(6) 9(7) 9(8) 9(9) | ≡ | INTEGER |
| Other Numeric (all other PIC 9's) e.g., 59(6)V99 | ≡ | DECIMAL DECIMAL(8.2) |

All non-numeric data becomes type CHAR. For an additional example, PIC X(10) becomes CHAR(10).

Numeric data items from PIC 9 to PIC 9(4) become SMALLINT (16-bit binary, an efficient data form); while data items from PIC 9(5) to PIC 9(9) become INTEGER (32-bit binary).

All other PIC 9 formats, including data items with a decimal point such as PIC 99V9, become DECIMAL (#,#). The first "#" is the total number of digits, while the second "#" is the number of digits after the decimal point.

Computational types do not really matter. No conversion occurs for COMP-4, so it is most efficient to use COMP-4 for PIC 9 to PIC 9(9).

The foregoing scheme of the exemplary embodiment solves one of the very basic problems in converting COBOL I/O statements, namely how to interface and handle the very formidable task of harmonizing the totally different concepts of handling integers and other numerical values which exist between COBOL and SQL.

Thus the exemplary embodiment of the invention uses the relationships expressed in the foregoing table to interface between the two different treatments of text, integers and other numeric values found in COBOL and SQL.

Dates

To specify that a numeric or alphabetic data item is a date, the user can use a special "date" comment. (See the section entitled "Using Directives", below.)

Field Names

If the user's COBOL application already exists, and if it must access a relational database that already exists, the user may have to work around differences in the names of the fields, as well as naming conventions imposed by the DBMSQL For example, the user's program might use the name EMPLOYEE-NO, while the database uses the name EMP-NUMBER for the same item of information.

Resolving Name Conflicts

If naming differences exist, the user need not rename the user's variables, and the user need not change the database. This is because the AcuCOBOL™-85 compiler builds data dictionaries that map the user's COBOL variables (regardless of their names) to the correct database fields. The user enables the compiler to make the mapping by adding directives to the user's COBOL code wherever the COBOL name differs from the database name.

Directives can also be used to produce other effects when data is mapped from COBOL to the SQL database. They can:

group fields together;

give a name to the data dictionary file;

treat selected numeric data as text strings;

set up conditions under which certain fields are defined; and specify additional data mapping options.

The following section explains each directive, describes when the user would use each, and provides examples.

Using Directives

AcuCOBOL™ data dictionaries 4 (note FIG. 1) are based on the user's COBOL FD's (file descriptors). Hence the dictionaries 4 (FIG. 1) are preferably called Extended FD's or XFD's. Each dictionary describes all of the fields for one file.

If the files used by the user's COBOL program contain no duplicate names, and if the default mapping rules described earlier in this document are sufficient for the user's situation, then the user's data dictionaries 4 may be built directly from the user's source code with no additional directives.

If the user would like to override the default mapping behavior, or map a field to a different name, then the user preferably may add directives to the user's COBOL code.

Directives are special comments that are used to guide the building of the data dictionaries. They always include special letters, for example, "XFD". These three letters indicate to the compiler that the comment is to be used in dictionary generation.

Syntax for Directives

A sample of COBOL code with three directives in place is:

```
01  EMPLOYEE-RECORD.
    03  DATE-HIRED.
        05  YY   PIC 99.
        05  MM   PIC 99.
        05  DD   PIC 99.
    03  DATE-LAST-PAID.
$ XFD NAME=YEAR-LAST-PAID
        05  YY   PIC 99.
$ XFD NAME=MONTH-LAST-PAID
        05  MM   PIC 99.
$ XFD NAME=DAY-LAST-PAID
        05  DD   PIC 99.
```

In the sample shown above, the "name" directive is used to associate an alternate name with three fields: "YY" is associated with "YEAR-LAST-PAID"; "MM" with "MONTH-LAST-PAID"; and "DD" with "DAY-LAST-PAID."

In the exemplary embodiment each directive should be placed on a line by itself, immediately before the COBOL line to which it pertains Additionally, the user introduces each directive with a "$" in the Indicator Area, followed by the letters "XFD". For example:

$ XFD NAME=EMP-NUMBER

An alternate way to introduce directives that is ANSI-compliant is with an "*" in the Indicator Area. In this case, the user begins the directive with the letters "XFD" and encloses the entire comment in double parentheses. For example:

* ((XFD NAME=EMP-NUMBER))

In the exemplary embodiment the user may use either form of the directive syntax (or a combination of both) in the user's applications.

The Alpha Directive

The "alpha" directive allows the user to treat a data item as alphanumeric text in the database, when it is declared as numeric in the COBOL program.

Syntax $ XFD ALPHA

This is especially useful when the user has numeric keys in which the user occasionally stores non-numeric data, such as LOW-VALUESQL In this situation, treating the field as alphanumeric allows the user to move any kind of data to it.

The "alpha" directive basically tells the interface: when the user takes this data item and moves it to the database, put quotation marks around it and treat it as a string.

Example $ XFD ALPHA

The Binary Directive

The "binary" directive is used to specify that the data could be alphanumeric data of any classification. Absolutely any data is allowed. Stored in a database-dependent format.

Syntax $ XFD BINARY

This directive implies the "alpha" directive.

Example $ XFD BINARY

The Date Directive

The "date" directive effectively says "I want to store this field in the database as a date." Because there is no COBOL syntax that identifies a field as a date, the user may want to add this directive to differentiate dates from other numbers.

Syntax $ XFD DATE

This directive implies the "numeric" directive.

If the user's data has any one of the following formats, the user in the exemplary may precede it with the "date" directive:

PIC 9(6)
PIC 9(8)
PIC X(6)
PIC X(8)

Other formats will produce a compile-time error if preceded by a "date" directive.

When the "date" directive is used, six-digit (or six-character) fields are stored as YYMMDD in the database. Eight-digit fields are stored as YYYYMMDD.

Example $ XFD DATE

The Name Directive

The "name" directive assigns a database field name to the field defined on the next line.

Syntax $ XFD NAME=fieldname

This directive has several uses, as shown in the following examples.

Example 1

Within a database file, all field names must be unique. (Multiple database files may include the same field name, but duplicates may not exist within a single file.) Unique field names are not required in COBOL, because names can be qualified by group items. For example, this code is acceptable in COBOL:

```
01  EMPLOYEE-RECORD.
    03  DATE,-HIRED.
        05  YY   PIC 99.
        05  MM   PIC 99.
        05  DD   PIC 99.
    03  DATE-LAST-PAID.
        05  YY   PIC 99.
        05  MM   PIC 99.
        05  DD   PIC 99.
```

The user need not change the field names in the user's COBOL program to access a database. Instead, the user uses the "name" directive to provide unique database names for the fields.

For example:

```
01  EMPLOYEE-RECORD.
    03  DATE-HIRED.
        05  YY   PIC 99.
        05  MM   PIC 99.
        05  DD   PIC 99.
    03  DATE-LAST-PAID.
$ XFD NAME=YEAR-LAST-PAID
        05  YY   PIC 99.
$ XFD NAME=MONTH-LAST-PAID
        05  MM   PIC 99.
$ XFD NAME=DAY-LAST-PAID
        05  DD   PIC 99.
```

Example 2

SQL-based databases require that names be no more than eighteen (18) characters long. If the user's COBOL names are longer than this, the interface will automatically truncate them after the 18th character.

If the user has names that are identical within the first eighteen (18) characters, or that are not meaningful to the user when shortened to eighteen (18) characters, the user can use the "name" directive to assign them different database field names. For example, if a portion of the user's database contained:

```
01  ACME-EMPLOYEE-RECORD.
    03  ACME-EMPLOYEE-RECORD-DATE-HIRED.
        05  HIRE-YY            PIC 99.
        05  HIRE-MM            PIC 99.
        05  HIRE-DD            PIC 99.
    03  ACME-EMPLOYEE-RECORD-DATE-LAST-PAID.
        05  LAST-PAY-YY        PIC 99.
        05  LAST-PAY-MM        PIC 99.
        05  LAST-PAY-DD        PIC 99.
```

The user could add two "name" directives to differentiate the two group names and make them meaningful with eighteen (18) characters:

```
01  ACME-EMPLOYEE-RECORD.
$ XFD DATE-HIRED
    03  ACME-EMPLOYEE-RECORD-DATE-HIRED.
        05  HIRE-YY            PIC 99.
        05  HIRE-MM            PIC 99.
        05  HIRE-DD            PIC 99.
$ XFD DATE-LAST-PAID
    03  ACME-EMPLOYEE-RECORD-DATE-LAST-PAID.
        05  LAST-PAY-YY        PIC 99.
        05  LAST-PAY-MM        PIC 99.
        05  LAST-PAY-DD        PIC 99.
```

Note that the user's COBOL names have not changed. The new names are used only for the database fields.

In the exemplary embodiment each time the user compiles the user's program and specifies "–Zx" to create data dictionaries, the compiler will truncate any field names longer than eighteen (18) characters. If any are identical within the first eighteen (18) characters, a warning message will be issued "where?". A warning of this type does not prevent the program from compiling, but does prevent the data dictionary from being generated for the file with the duplicate names.

Example 3

The user may want to use the "name" directive to assign shorter names than those used in the user's COBOL programs. This makes the formation of interactive SQL queries easier and quicker.

The Numeric Directive

The "numeric" directive allows the user to treat a data item as an unsigned integer when it is declared as alphanumeric.

Syntax $ XFD NUMERIC

Example $ XFD NUMERIC

The Use Group Directive

The "use group" directive allows the user to enter a group item into the database as a single field, instead of using the elements contained in the group. This is helpful if the group is more interesting to the user's application than the individual fields.

Syntax $ XFD USE GROUP

By default, the "use group" directive implies that the consolidated field is alphanumeric. If the user want a numeric field, the user may simply add the word "NUMERIC" at the end of the directive.

Example

For example, the directive in the following code indicates that the date should be entered into the database as a single numeric data item instead of three distinct fields

```
$ XFD USE GROUP, NUMERIC
    03  DATE-ENTERED.
        05  YY   PIC 99.
        05  MM   PIC 99.
        05  DD   PIC 99.
```

Either a comma or a space may separate,the word "NUMERIC" from the words "USE GROUP".

Other fields with which the user might use this directive include multi-part general ledger account numbers and department numbers, and keys that are meaningful as a unit but not as individual pieces.

Whether to group fields or not depends on how the user wants to process them. Does the user always store and use the fields together? If so, the user would gain efficiency by grouping them. Someone who really knows how the data is being used in the database should help to identify groups of fields that should be combined to speed processing.

The When Directive

The "when" directive is used to tell preferred embodiment of the program how to handle multiple record types and REDEFINES. It lets the user state under which conditions certain fields are defined.

Syntax $ XFD WHEN field=value

Example

In the following code, the "when" directive determines when each of the two record types is defined:

```
01  AR-CODES-RECORD.
    03  AR-CODES-KEY.
        05  AR-CODE-TYPE              PIC X.
        05  AR-CODE-NUM               PIC 999.
$ XFD WHEN AR-CODE-TYPE = "S"
01  SHIP-CODE-RECORD.
    03  FILLER                        PIC X(4).
    03  SHIP-INSTRUCT                 PIC X(15).
$ XFD WHEN AR-CODE-TYPE = "T"
01  TERMS-CODE-RECORD.
    03  FILLER                        PIC X(4).
    03  TERMS-RATE-1                  PIC S9V999.
    03  TERMS-DAYS-1                  PIC 9(3).
    03  TERMS-RATE-2                  PIC S9V999.
    03  TERMS-DESCRIPT                PIC X(15).
```

One of the biggest problems in converting COBOL I/O into database actions is handling field redefinitions and multiple record types. The default rules provide a method for handling this, but they won't work for all situations. They essentially remove all redefinitions and multiple record types. This works, but it provides a very incomplete view of the data.

A better solution is to be able to identify which fields belong to which types of records. Then all of the fields are represented in the database as columns, but only select ones are actually used for each record. The idea is to define a field that appears in every record as a conditioning field. The value of this field defines which other fields are used in the record.

This is the purpose of the "when" directive. It identifies a condition that must be met before the following field(s) are used for a particular record.

Consider the following example:

```
01  EMPLOYEE-RECORD.
    03  EMPLOYEE-KEY.
        05  EMPLOYEE-NO               PIC 9(5).
        05  EMPLOYEE-REC-TYPE         PIC X.
            88  EMP-PAY-REC           VALUE "P".
            88  EMP-DATA-REC          VALUE "D".
    03  EMPLOYEE-PAY-DATA.
        05  EMPLOYEE-RATE             PIC 9(5)V99.
        05  EMPLOYEE-HOURS            PIC 9(4)V9.
    03  EMPLOYEE-PERSONNEL-DATA REDEFINES
        EMPLOYEE-PAY-DATA.
        05  EMPLOYEE-MARITAL-STATUS   PIC X.
        05  EMPLOYEE-RACE             PIC 99.
    05  EMPLOYEE-DEPENDENTS           PIC 99.
```

In this record, there are two views of the record depending on the value of EMPLOYEE-REC-TYPE. For "P"-type records, the EMPLOYEE-DATA is used. For "D"-type records, the EMPLOYEE-PERSONNEL-DATA is used.

Using the default rules, the last three data items in the record are not included in the XFD file. This will cause these fields to be not represented in the corresponding database. Furthermore, errors are likely to occur when the database stores "D"-type records because the values in EMPLOYEE-RATE and EMPLOYEE-HOURS will not be valid numbers.

Using the "when" directive, this record could be entered into the dictionary as follows:

```
01  EMPLOYEE-RECORD.
    03  EMPLOYEE-KEY.
        05  EMPLOYEE-NO               PIC 9(5).
        05  EMPLOYEE-REC-TYPE         PIC X.
            88  EMP-PAY-REC           VALUE "P".
            88  EMP-DATA-REC          VALUE "D".
*((XFD WHEN EMPLOYEE-REC-TYPE = "P"))
    03  EMPLOYEE-PAY-DATA.
        05  EMPLOYEE-RATE             PIC 9(5)V99.
        05  EMPLOYEE-HOURS            PIC 9(4)V9.
*((XFD WHEN EMPLOYEE-REC-TYPE = "D"))
    03  EMPLOYEE-PERSONNEL-DATA REDEFINES
        EMPLOYEE-PAY-DATA.
        05  EMPLOYEE-MARITAL-STATUS   PIC X.
        05  EMPLOYEE-RACE             PIC 99.
        05  EMPLOYEE-DEPENDENTS       PIC 99.
```

This would cause the EMPLOYEE-PAY-DATA fields to be defined only when EMPLOYEE-REC-TYPE was "P" and would cause EMPLOYEE-PERSONNEL-DATA to be defined when EMPLOYEE-REC-TYPE was "D." Note that in this case, the default rule for handling REDEFINES is overridden. Instead of ignoring the fields in the REDEFINES, they are represented as fields with a condition assigned to them.

This notion can be used to handle multiple record types. There are several important points however.

1. The field that is used to determine a condition cannot be conditioned on itself. When multiple record types are used, every field is based on a condition. Therefore, it is necessary to create a new rule that states that the field used to determine a condition is always marked as not being based on a condition.

2. The same problem occurs for keys of the file. The rules of COBOL insure that each key is represented in each record by with data that is the same size and in the same position, but not necessarily in the same format. In the database, each key can only have one definition. Therefore, no key field can be marked as belonging to a condition. One alternative is that the fields used to define the keys are those named in the KEY phrase of the file's SELECT statement. If a group item is named, then its elementary fields are used to define the key fields (unless the "use group" directype is also specified).

3. Note that for the keys and the condition-field, there will be fields in the alternate records that overlap them. These overlapping fields must be automatically removed from the dictionary because they are conditionally-based fields the redefine areas that are not based on a condition. This would case a confusing multiple definition if they were not removed.

Alternatively, one could just include them and have duplicated columns in the database. However, this is a less desirable alternative, because database design generally states that each piece of data should be represented only once.

Here is a comprehensive example:

```
SELECT AR-CODES-FILE
        ASSIGN TO DISK "ARCODES"
        ORGANIZATION IS INDEXED
        ACCESS MODE IS DYNAMIC
        RECORD KEY IS AR-CODES-KEY.
FD      AR-CODES-FILE.
01      AR-CODES-RECORD.
        03   AR-CODES-KEY.
             05   AR-CODES-TYPE           PIC X.
                  88   SHIPPING-CODE      VALUE "S".
                  88   TERMS-CODE         VALUE "T".
             03   AIR-CODES-NUM           PIC X(3).
*((XFD WHEN AR-CODES-TYPE = "S"))
01      SHIPPING-CODES-RECORD.
        03   SHIPPING-KEY.
             05   SHIPPING-TYPE           PIC X.
             05   SHIPPING-CODE-NUM       PIC X(3).
        03   SHIPPING-DESCRIPTION         PIC X(15).
*((XFD WHEN AR-CODES-TYPE = "T"))
01      TERM-CODES-RECORD.
        03   TERM-CODES-KEY.
             05   TERM-CODE-TYPE          PIC X.
             05   TERM-CODE-NUM           PIC X(3).
        03   TERM-CODES-DESCRIPTION       PIC X(15).
        03   TERM-CODES-RATE-1            PIC 99V999.
        03   TERM-CODES-RATE-2            PIC 99V999.
        03   TERM-CODES-RATE-1-PERIOD     PIC 9(4).
```

This would produce the following dictionary (named "arcodes.xfd"):

```
XFD,01,AR-CODES-FILE,ARCODES
00033,00004,001
1,0,004,00000
02
AIR-CODES-TYPE
AR-CODES-NUM
02
001,1,AR-CODES-TYPE, "S"
002,1,AR-CODES-TYPE, "T"
0007
00000,00001,16,00001,+00,000,000,AR-CODES-TYPE
00001,00003,16,00003,+00,000,000,AR-CODES-NUM
00004,00015,16,00015,+00,000,001,SHIPPING-DESCRIPTION
00004,00015,16,00015,+00,000,002,TERM-CODES-DESCRIPTION
00019,00005,01,00005,-03,000,002,TERM-CODES-RATE-1
00024,00005,01,00005,-03,000,002,TERM-CODES-RATE-2
00029,00004,01,00004,+00,000,002,TERM-CODES-RATE-1-PERIOD
```

It should be noted that the entire SHIPPING-KEY and TERM-CODES-KEY fields were eliminated from the dictionary. This is because they redefine the key arena which is not based on a condition (and we can't have the same data fields simultaneously represented by more than one data item).

Handling Invalid Data

This section describes how the interface converts invalid data before it writes to the database.

Compiler Options

This section explains the exemplary compile-time options that can be used with the interfaces of the preferred embodiment.

–Zo

This option specifies the name of the directory that will hold the data dictionary files. A space is typed after the option and then the name of the chosen directory is given.

If this option is not used, and if the XFD-DIRECTORY variable is not set in the user's configuration file, the data dictionaries will be placed into the current directory in the exemplary embodiment.

Example

To cause the dictionaries to be stored in the directory "/usr/inventory/dictionaries" the user would enter –Zo /usr/inventory/dictionaries See also the "–Zx" compile-time option causes data dictionaries to be built.

–Zx

This option tells the compiler to build data dictionaries for every data file opened by this program.

The interface 5 (FIG. 1), as designed in the exemplary embodiment, cannot operate without data dictionaries.

Example

To cause the dictionaries to be stored in the directory "/usr/inventory/dictionaries" the user would enter:

–Zo /usr/inventory/dictionaries

See also the "–Zo" compile-time option, which specifies the directory where the data dictionaries will be placed.

SUMMARY OF SOME PROBLEMS & SOLUTIONS OF INVENTION

As a general approach (subject to some variation) this part of the specification will be presented in "problem and solution" format with particular emphasis being given to the primary COBOL I/O statements, which are the COBOL statements most involved in the conversion process of the invention.

Of course, the general problem is the inability and incompatibility of the two languages to permit the direct conversion of COBOL statements to SQL statements.

The primary problem areas include:

problems related to incompatibility of statement function;

problems related to incompatibility of data storage strategy;

problems related to incompatibility of data types; and problems related to incompatibility of sequencing strategy.

Also, the exemplary embodiment includes innovative techniques to increase efficiency of execution to speed up the conversion process, all of which will be discussed below

I. INCOMPATIBILITIES RELATED TO STATEMENT FUNCTIONS

A. PROBLEMS

COBOL's READ Statement:

READ NEXT, a very common form of the read statement, uses the COBOL concept of sequencing. This concept at least on the surface is foreign to SQL. The use of SELECT and ORDER statements in SQL inhibit the ability to lock as directed by COBOL.

COBOL's OPEN, CLOSE Statements:

The OPEN and CLOSE statements of COBOL refer to the opening and closing of files and therefore have no SQL equivalent. The COBOL programmer expects to be able to check messages indicating the availability of the specified file. At this time COBOL also does resource allocation to efficiently handle the file. In contrast, at the creation of an SQL table, privileges for different users are established.

COBOL's DELETE, WRITE, REWRITE Statements:

COBOL's DELETE, WRITE and WRITE statements delete, add and update rows in tables, whereas other I/O verbs create relatively intimidating problems in bridging the gap between COBOL and SQL, the use of the data dictionary makes the problem of finding the SQL verb to accomplish the COBOL objective for DELETE, WRITE and REWRITE straightforward.

COBOL's START Statement:

COBOL's START is used to define the place from which automatic sequencing will occur. Since sequencing is not a natural strategy of SQL, SQL has no START statement. A further potential inconsistency between COBOL's START and SQL is that since the START value is provided by the user, not only might it not be in the SQL table, it might not be a valid SQL data type.

COBOL's UNLOCK Statement:

Locking and unlocking in SQL is done with cursors. Multiple records can be locked in COBOL in a manner very different from SQL.

COBOL's I/O STATUS Statement:

I/O status is expected by the COBOL program from all I/O statements. The codes expected to be returned by COBOL are not provided by SQL.

B. SOLUTIONS of INVENTION

COBOL's READ Statement:

Replace the automatic sequencing accomplished by COBOL with an SQL non-automatic sequence control accomplished by tracking sequence by keeping a copy of the last key value found and, when necessary, re-selecting (i.e. use SQL SELECT) data from one of the keys by the use of the WHERE phrase. By experimentation it was determined that the WHERE selection process had a side effect by which the key values would be returned in sequence if the WHERE statement were simple, such as SELECT* customer#WHERE customer#>X. If the keys are multiple, one cannot select for one key and get the desired result. A compound request, which would logically accommodate the multiple keys, violates the simple WHERE rule and fails to return the keys in sequence (as determined by experimentation).

The solution then requires phase processing, where first the program selects for everything that is equal to a particular higher order key and greater than a particular lower order key, retrieves all those records and, after processing, again requests those records equal to the high order key but greater than the most recently processed lower order key. When a null set is returned, the higher order key can be incremented and the process repeated, always using a "simple" WHERE statement, which results in sequential return of lower order keys.

After much further laborious work it was discovered that the solution to the difficult problem of identical keys can be solved by resort to the use of SQL's unique row number.

1. Repetitive Instruction Optimization (RIO)

The functioning of COBOL's READ NEXT, as well as of many other COBOL verbs, demands on the SQL side frequent repetitive use of the same SELECT routine. In the exemplary embodiment of the invention, previously formed SQL statements are retained on a limited basis in an easily accessible area for the purpose of saving the resources involved in recreating SQL statements and corresponding machine language statements for execution when it can be determined that the retained SQL is appropriate for the COBOL being processed. In this manner, the incidence of the repetitive use of instructions without the necessity of regeneration is optimized.

This described "repetitive instruction optimization" (RIO) technique of the invention was necessary to invent and implement after it was discovered that performance on standard benchmark COBOL programs had been reduced by about fifty (50%) percent with the introduction of the earlier development embodiment(s) of the present invention without "RIO" of SELECT routines. "RIO" brought the performance of these benchmark COBOL programs up to the previous performance standard.

There are problems involved with locking and sequencing. In SQL, the only way in which records may be locked is to select for update, fetch, and the cursor, which is the owner of the lock, is the argument of the fetch. When the COBOL program calls for a single lock, the exemplary embodiment uses one cursor for both locking and sequence location.

COBOL's OPEN, CLOSE Statements:

An OPEN statement suggests the opportunity to check the requisite SQL table for its existence and for the appropriate matching with the data dictionary elements for the named COBOL file by using SELECT* (tablename) SQL statements. This statement is followed by an SQL DESCRIBE statement, which returns a description of the table, which is then matched with the data dictionary elements for the COBOL file and related messages returned to the COBOL program.

Appropriate resource management is also done at this time. With OPEN OUTPUT statements, an SQL table is created with appropriate SQL statements.

Since COBOL programs do not distinguish privileges between users, the SQL table created makes equal privileges with a runtime option for unequal privileges. At the OPEN statement different data types are matched preferably in accordance with the equivalence relationships presented in the "COBOL Data Declaration Conversion Table" above.

At the time of the COBOL CLOSE statement the SQL cursors are closed by use of an SQL CLOSE statement. Similarly, resource saving is implemented consistent with the non-use of the SQL table.

COBOL's START Statement:

The implementation of START in SQL is intimately connected with sequencing as in READ NEXT. The exemplary embodiment of the invention generates the logic for the first READ statement generating the SQL statements and tests the reading of the first record, returning error codes for improper starting position to the COBOL program. The solution to a common problem of using the SQL invalid LOW VALUES or spaces is to infer the programmer's intent to start at the lowest valid value in the SQL key. Therefore numeric spaces are translated to zeroes, and low values are translated to the most negative theoretical value that can fit into the SQL field (negative 9's).

COBOL's UNLOCK Statement:

If unlocking is done by COBOL's UNLOCK instruction, the SQL implementation is straightforward, closing all of the cursors.

COBOL's I/O STATUS Statement:

COBOL status codes are artificially generated from the results of the "in lieu of" SQL statements described in the OPEN solution section above.

II. INCOMPATIBILITIES RELATING TO DATA STORAGE STRATEGY

A. PROBLEMS (COMPARISON OF DATA STORAGE STRATEGIES)

Although both COBOL and SQL have flexibility of varying degrees, they differ markedly in data storage strategy. COBOL, much older and related more closely to streams of punched cards or paper or magnetic tape, tends to look at data as a one dimensional stream in which sequence is paramount. SQL, more associated with more recent, real time applications, prefers a two dimensional address to access data rather than using sequence.

B. SOLUTIONS of INVENTION (DATA DICTIONARY)

At compile time a dictionary of potential SQL row and column elements is made from the source program such that at any time a COBOL field is referenced in the COBOL program, the corresponding SQL column or field is immediately available for substitution. Multiple field definitions allowed in COBOL are internally swapped for their equivalents.

III. INCOMPATIBILITIES RELATED TO DATA TYPES

A. PROBLEMS

1. Comparison of Data Types

COBOL uses the data types listed in the column on the left side of the "COBOL Data Declaration Conversion Table" presented above to represent data, while SQL data types are listed on the right side of the Table. These varying data types between the languages are well known to those of skill in those languages and are described in detail in the literature.

2. Comparison of Data Validity Rules

Certain COBOL allowable data types are not allowable in SQL (as determined by experimentation), e.g. first eight (8) bits=0 is not allowed in SQL. Null fields exist in SQL but not COBOL. SQL has date fields in different formats than COBOL.

B. SOLUTIONS of INVENTION

1. Data Equivalence Table

See the preferred, exemplary equivalence relationships contained in the "COBOL Data Declaration Conversion Table" above, as used in the preferred embodiment of the invention. The values of the table have been determined and confirmed by experimentation.

Further experimentation confirms the success of the technique of expanding the eight "0s" field from COBOL to nine digits in SQL with a leading non-zero digit.

Further suggested techniques for handling data validity inconsistencies are:

null SQL fields are translated into COBOL as zeros;

zero date COBOL fields are translated into null SQL date fields; and invalid numeric COBOL fields are translated as null SQL fields.

The date format for COBOL must be translated into SQL by a detailed, logical mapping.

2. Invalid Data Routines

The SQL field is expanded to nine digits and padded with an acceptable leading digit. Null SQL fields are translated as zeroes into COBOL date fields and vice-versa. (Results may be determined by experimentation.)

Additional information concerning the programming techniques and innovations which allow the exemplary embodiment to achieve the conversion of the invention is contained in the additional information presented before this "problem and solution" section.

MODIFYING EXEMPLARY EMBODIMENT FOR OTHER VERSIONS OF COBOL & SQL

As noted above, the exemplary embodiment was conceived in connection with a COBOL program written in accordance with ANSI standard 85 COBOL as provided in AcuCOBOL™-85 interfacing with an Informix™ SQL oriented database. However, there are a number of variants of the COBOL and SQL languages to which the present invention can be applied. Indeed it is believed that it can be applied to all of them with little change and no change beyond the level of ordinary skill in the art.

It would of course simplify matters if there was only one version of SQL and only one version of COBOL and that these versions would remain static.

However, with respect particular to, for example, SQL, as brought out in the *SQL PROGRAMMERS'S GUIDE* referred to above, such is not the case because currently every vendor has differentiated their respective SQL "engine" in minor, and in some cases, major ways. Even IBM™'s several products—DB2, SQL/DS, and OS/2 Extended Edition, for instance—differ from each other. As a result, SQL implementations are only imperfectly compatible with one another, and greater portability and connectivity are actively worked on by the standards group, including in particular the American National Standards Institute or "ANSI".

Part of the problem is that effecting complete compatibility involves more than just having all vendors agree on a certain set of features to offer. Besides incompatibilities that stem from vendors offering different extensions, incompatibilities are possible even among vendors offering exactly the same features and extensions.

Incompatibilities can appear at several levels. The outermost are the languages themselves—the level of, for example, such SQL statements as SELECT, UPDATE, and INSERT. Although different implementations agree in the main on these; they tend to add clauses of their own for special purposes, or even to add entirely new types of statements. Or the syntax of the statements may vary to some extent among different systems.

At another level, differences can exist in the function call interface (also called the API—"application programming interface") or even in the pre-compiler syntax.

The analogy here is to written as opposed to spoken language—even when a spoken language is shared, different communities may write the language differently. One might write "color" and another write "colour". Likewise, for one SQL system, the function call to connect to a database might be ORACON; for another it might be SQLCON or SQL-CONNECT. Or arguments might appear in a different order—user name, database name, password versus password, database name, user name, etc. Differences such as these can persist at the programmatic level even in the face of standardization at the level of SQL statements. And in fact standardization at this level does not receive as much attention as the standardization of SQL statements themselves.

When there are differences at either of these levels, the incompatibilities interfere with the ability to connect front ends and back ends of different vendors and to run the program of the invention on a variety of machines.

Then, too, as noted, the COBOL programming language also is not entirely standardized. COBOL on a mainframe is not necessarily the same as COBOL on a microcomputer or COBOL on a minicomputer. And here again one may encounter incompatibilities arising from the fact that different versions of the COBOL language are offered by different vendors.

Not complete but at least general standardization of the SQL language is now actively being worked on, although, like COBOL, this "standardization" does not mean that all vendors' versions will then offer exactly the same features and use exactly the same syntax.

There is no reason to think that developers will stop having ideas for interesting new features for actively used languages, such as COBOL and SQL. Standardization is always bound to lag behind such new developments, no matter how much the boundaries of standard SQL or COBOL continue to expand, encompassing a greater and greater body of features. The frontier is likely to keep expanding too, and, on the frontier one will always likely find diversity.

However, for the application or use of the present invention, this means that there is a substantial and growing subset of the SQL language that is relatively static, and COBOL has been well defined standardized in COBOL based on ANSI standard 85. Thus, the embodiment(s) hereof and the teachings of the present invention can be used with some confidence that, for example, the preferred embodiment hereof will work with other SQL engines and other versions of COBOL with little if any change, and no change beyond the level of those of ordinary skill. Comparable function calls belonging to different systems but the same language tend to differ, as was noted above earlier, only in minor syntactic details.

Another development in SQL that will tend to minimize the problem of portability of the exemplary embodiment and future embodiments of the invention is the appearance of application development tools that include a fourth-generation language. These development tools allow applications to be built virtually or entirely without coding and with little or no attention paid to tailoring them to a particular engine. Rather, the application is assembled from the menus and options of the tool, which comes with a selection of SQL drivers. The drivers—also called translators or routers—will, it is believed, enable the exemplary embodiment hereof to run with many different SQL engines with little, if any, significant modification.

Hence, it should be understood that the principles and teachings of the present invention have broad applicability to, it is believed, all known versions of standardized COBOL and established SQL languages, as well as those currently perceived for the future.

Thus, the embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. In a computer system, a method of converting COBOL statements in a COBOL program into SQL statements to obtain data in an SQL oriented database for use in the COBOL program, comprising the following steps:

a. compiling the COBOL application program in source code form using a COBOL compiler, and, in conjunction with the source code program being compiled to produce the application program in object code form, analyzing and evaluating the COBOL application program, at least with respect to its data fields and how those fields are used in the application program, to create a set of values based on the compiler's analysis and evaluation of the COBOL program's data fields and their usage in the program; and b. as the compiled COBOL application program runs COBOL I/O statements involving data in a SQL database, generating and sending SQL statements to the SQL oriented database based on the COBOL statements and the set of values, effectively converting the COBOL statements into SQL statements, obtaining the data desired by the COBOL program based on the data in the SQL oriented database through an interfacing program which receives those COBOL I/O statements and generates the SQL statements, and using the COBOL compiler program itself to produce not only the compiled COBOL program in object form, but also directly create a data dictionary file in which the series of values is stored.

2. The method of claim 1, wherein there is further included in connection with step "b" the following step(s):

converting the COBOL statements to SQL statements based at least in part on how the COBOL data is declared in the COBOL application program in accordance with the "equivalence" expressed in the table below

| COBOL | | SQL |
|---|---|---|
| PIC X(15) | = | CHAR(15) |
| PIC 9 | = | SMALL INT |
| 99 | | |
| 999 | | |
| 9999 | | |
| PIC 9(5) | = | INT |
| 9(6) | | |
| 9(7) | | |
| 9(8) | | |
| 9(9) | | |
| Other Numeric | = | DECIMAL |
| (all other PIC 9's) | | |
| e.g., 59(6)V99 | | DECIMAL(8,2). |

3. In a computer system, an apparatus for automatically generating SQL statements from a COBOL source code program such that the SQL statements effectuate operational interface between the COBOL source code program and a relational data base, comprising:

dictionary means created in compile time and to be usable in run-time, for correlating COBOL fields with SQL fields;

invalid data recovery means for allowing continued operation despite use of invalid data;

sequence simulating means for generating SQL statements to simulate COBOL sequencing; and COBOL statement conversion means for providing SQL statements which in concert perform the objectives of the COBOL statements.

4. The apparatus of claim 3, wherein there is further included:

means for repeatedly using previously generated SQL statements.

5. The apparatus of claim 3, wherein said sequence simulating means uses a different process for higher order keys which changes relatively little and lower order keys which change more frequently.

6. The apparatus of claim 3, wherein said sequence simulating means uses SQL unique row identification when key fields are equal.

7. A method of automatically generating SQL statements from a COBOL source code program, having an objective, such that the SQL statements effectuate the use by the COBOL source code program of relational data base I/O, comprising the following steps:

a. correlating COBOL fields by means of a dictionary created in compile time and to be usable in run-time with SQL fields;

b. recovering from invalid data signals from COBOL or SQL fields to allow continued processing consistent with the objective of the COBOL source code program;

c. generating SQL statements to simulate required COBOL sequencing; and d. converting COBOL statements into SQL statements which in concert perform the objective of the COBOL statements.

8. The method of claim 7, wherein there is further included the step(s) of:

optimizing the repetitive use of previously generated instructions.

9. The method of claim 7, wherein step "c" further includes the step(s) of:

generating SELECT statements.

* * * * *